US007669071B2

(12) United States Patent
Cochran et al.

(10) Patent No.: US 7,669,071 B2
(45) Date of Patent: Feb. 23, 2010

(54) POWER ALLOCATION MANAGEMENT IN AN INFORMATION HANDLING SYSTEM

(75) Inventors: Stephen D. Cochran, Cedar Park, TX (US); Sandor T. Farkas, Round Rock, TX (US); Akkiah Maddukuri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 303 days.

(21) Appl. No.: 11/381,926

(22) Filed: May 5, 2006

(65) Prior Publication Data

US 2007/0260897 A1 Nov. 8, 2007

(51) Int. Cl.
*G06F 1/00* (2006.01)
*G06F 11/30* (2006.01)

(52) U.S. Cl. ................ 713/340; 713/300; 713/310; 713/320

(58) Field of Classification Search .......... 713/300, 713/310, 320, 340
See application file for complete search history.

(56) References Cited

U.S. PATENT DOCUMENTS

| 4,596,907 | A | 6/1986 | LaGreco et al. ............... 200/50 |
|---|---|---|---|
| 5,386,363 | A | 1/1995 | Haak et al. ............. 364/424.01 |
| 5,410,714 | A | 4/1995 | Yorimoto et al. ............ 395/750 |
| 5,532,945 | A | 7/1996 | Robinson .................... 364/707 |
| 5,727,168 | A | 3/1998 | Inoue et al. ................. 395/282 |
| 5,734,618 | A | 3/1998 | Mizuta ....................... 365/229 |
| 5,987,617 | A | 11/1999 | Hu et al. ..................... 713/320 |
| 6,016,547 | A | 1/2000 | Ono ............................ 713/300 |
| 6,029,006 | A | 2/2000 | Alexander et al. ..... 395/750.05 |
| 6,240,337 | B1 | 5/2001 | Marr, Jr. et al. ............. 700/286 |
| 6,308,285 | B1 | 10/2001 | Bowers ...................... 714/10 |
| 6,388,884 | B1 | 5/2002 | Greco et al. ................ 361/754 |
| 6,496,915 | B1 | 12/2002 | Halleck ...................... 711/171 |
| 6,523,125 | B1 | 2/2003 | Kohno et al. ............... 713/320 |

(Continued)

FOREIGN PATENT DOCUMENTS

GB 2373896 A 10/2002

(Continued)

OTHER PUBLICATIONS

Notification of Second Office Action for Chinese Patent Application No. 200710109771.4 with English translation (8 pages), Nov. 21, 2008.

(Continued)

*Primary Examiner*—Thomas Lee
*Assistant Examiner*—Jaweed A Abbaszadeh
(74) *Attorney, Agent, or Firm*—Baker Botts L.L.P.

(57) ABSTRACT

An information handling system includes modular processing resources, each having a main processor, system memory, and preferably a service processor resource. A management resource coupled to a service processor resource evaluates a system power budget and allocates power to a processing resource by indicating a critical power level. The processing resource determines a warning power level based on the critical power level and monitor its actual power consumption. If actual power consumption exceeds the critical power level, the processing resource is powered down. If actual power consumption exceeds the warning power level, the processing resource throttles its performance to conserve power and requests a power allocation increase. If actual power consumption is below the warning power level, the processing resource may request a reduction in allocated power.

21 Claims, 3 Drawing Sheets

U.S. PATENT DOCUMENTS

| | | | |
|---|---|---|---|
| 6,601,181 B1 | 7/2003 | Thomas | 713/340 |
| 6,785,826 B1* | 8/2004 | Durham et al. | 713/300 |
| 6,834,353 B2 | 12/2004 | Smith et al. | 713/320 |
| 6,850,417 B2 | 2/2005 | Cooper et al. | 361/752 |
| 6,950,950 B2* | 9/2005 | Sawyers et al. | 713/300 |
| 6,950,952 B2 | 9/2005 | Felsman | 713/310 |
| 7,020,790 B2 | 3/2006 | Mares | 713/340 |
| 7,058,828 B2 | 6/2006 | Barr et al. | 713/320 |
| 7,076,671 B2 | 7/2006 | Espinoza-Ibarra et al. | 713/300 |
| 7,210,048 B2* | 4/2007 | Bodas | 713/320 |
| 7,240,225 B2* | 7/2007 | Brewer et al. | 713/300 |
| 2002/0108065 A1 | 8/2002 | Mares | 713/300 |
| 2003/0079150 A1 | 4/2003 | Smith et al. | 713/300 |
| 2003/0126474 A1* | 7/2003 | Sawyers et al. | 713/300 |
| 2004/0025064 A1 | 2/2004 | Felsman | 713/300 |
| 2004/0030940 A1 | 2/2004 | Espinoze-Ibarra et al. | 713/300 |
| 2004/0030944 A1 | 2/2004 | Barr et al. | 713/400 |
| 2004/0128562 A1 | 7/2004 | Bigelow et al. | 713/300 |
| 2004/0163001 A1* | 8/2004 | Bodas | 713/300 |
| 2004/0230846 A1 | 11/2004 | Mancey et al. | 713/300 |
| 2004/0243859 A1 | 12/2004 | Mueller et al. | 713/300 |
| 2004/0268166 A1* | 12/2004 | Farkas et al. | 713/320 |
| 2005/0034000 A1 | 2/2005 | Lee | 713/320 |
| 2005/0055587 A1 | 3/2005 | Lee | 713/300 |
| 2005/0102544 A1* | 5/2005 | Brewer et al. | 713/320 |
| 2005/0125703 A1 | 6/2005 | Lefurgy et al. | 713/320 |
| 2005/0138440 A1 | 6/2005 | Barr et al. | 713/300 |
| 2005/0210304 A1 | 9/2005 | Hartung et al. | 713/320 |
| 2005/0262364 A1 | 11/2005 | Diab et al. | 713/300 |
| 2005/0283624 A1 | 12/2005 | Kumar et al. | 713/300 |
| 2006/0005057 A1 | 1/2006 | Nalawadi et al. | 713/320 |
| 2006/0053324 A1 | 3/2006 | Giat et al. | 713/300 |
| 2006/0136761 A1* | 6/2006 | Frasier et al. | 713/320 |
| 2006/0149978 A1* | 7/2006 | Randall et al. | 713/300 |
| 2006/0230299 A1 | 10/2006 | Zaretsky et al. | 713/320 |
| 2006/0253715 A1* | 11/2006 | Ghiasi et al. | 713/300 |
| 2007/0118772 A1* | 5/2007 | Diab | 713/300 |
| 2007/0143635 A1* | 6/2007 | Hughes et al. | 713/300 |
| 2007/0245161 A1* | 10/2007 | Shaw et al. | 713/300 |
| 2007/0250722 A1* | 10/2007 | Montero et al. | 713/300 |

FOREIGN PATENT DOCUMENTS

| | | |
|---|---|---|
| GB | 2380839 A | 4/2003 |
| JP | 2002-300724 | 10/2002 |
| WO | 00/20955 | 4/2000 |

OTHER PUBLICATIONS

Austrian Search Report and Written Opinion, Application No. 200703148-7, 7 pages, Aug. 1, 2008.

Office Action for Chinese Patent Application No. 200710109771.4 with English translation (8 pages), Jun. 6, 2008.

Response to Written Opinion for Singapore Patent Application No. 200703148-7, 9 pages, Filed Jan. 21, 2009.

Singapore Search and Examination Report; Application No. 200703148-7; pp. 4, Feb. 27, 2009.

Office Action in German application No. DE 10 2007 021 258.7-53 mailed Jul. 9, 2009, 6 pages.

* cited by examiner

POWER ALLOCATION MANAGEMENT IN AN INFORMATION HANDLING SYSTEM

TECHNICAL FIELD

The present invention is in the field of computer systems and, more particularly, power management in server class computer systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a server, which is a processor-based network device that manages network resources. As examples, a file server is dedicated to storing files, a print server manages one or more printers, a network server manages network traffic, and a database server processes database queries. A Web server services Internet World Wide Web pages.

In recent years, servers have been implemented as "blade servers." Blade servers are so named because they employ server blades, which are thin, modular electronic circuit boards containing one or more microprocessors, memory, and other server hardware and firmware. Blade servers, which are sometimes referred to as a high-density servers, typically include a space saving, rack-based chassis that accepts multiple server blades. Blade servers are often used in clusters of servers dedicated to a single task. For example, a blade server may function as a web server by servicing web-based requests addressed to one or more universal resource locators (URLs). In this implementation, the blade server may route individual requests to different server blades within the blade server based on factors including the current loading of individual blades and the locality of information required to respond to a request, all in a manner that is transparent to the user.

In addition to server blades, which provide the core processing resources of a blade server, blade servers may also include a management resource, power supply resources, I/O resource, and environmental control resources such as fans. A management resource enables remote access to the blade server and to the individual server blades within the blade server. Management resources enable an administrator to power on, reboot, and power down individual server blades as needed or in response to warnings, failures, and the like.

Power conservation is an increasingly important consideration in the design and implementation of blade servers. Power consumption is not only costly, but it also generates heat that must be dissipated to maintain performance parameters as well as the electrical and mechanical integrity of the server. Traditional blade server implementations impose power restrictions on individual blades based on static power levels provided by the blade to ensure that power capacity is not exceeded. Moreover, the static level provided the blade in such implementations is typically based on a theoretical maximum power draw based on the blade's configuration. Because the power management implementation is founded upon the maximum power draw, power allocation is necessarily overly conservative, resulting in denial of power up requests or forced performance throttling of server blades when, in reality, sufficient power is available.

SUMMARY OF THE INVENTION

Therefore a need has arisen for an information handling system operable to manage and allocate power to modular resources of the system dynamically and based on actual power consumption of the system's resources.

In one aspect, an information system capable of allocating power to its resources is described. The information handling system includes a processing resource having one or more main processors and system memory accessible to the main processor(s). A management resource coupled to the processing resource is configured to power off, reboot, and power on the processing resource remotely. The processing resource may have a service processor resource that communicates with the management resource for this purpose. The management resource is designed to respond to a power allocation request from a processing resource by evaluating a power budget of the system as a whole and allocating power to the processing resource. The management resource indicates the allocated power by returning a maximum or critical power level to the processing resource. The processing resource is configured to receive the critical power level and to determine a warning power level based on the critical power level. The processing resource responds to a power consumption level exceeding the critical power level by powering off. The processing resource is configured to respond to an actual power consumption level exceeding the warning power level by transitioning to a power conserving mode and requesting an additional allocation of power from the management resource.

In another aspect, a method of allocating power in an information handling system is disclosed. Responsive to a power allocation request from a processing resource, a management resource determines a power allocation for the requesting processing resource and indicates a critical power level to the processing resource. The processing resource, in response to receiving the critical power level, determines a warning power level that is lower than the critical power level. The processing resource monitors actual power consumption and, in response to monitoring an actual power consumption exceeding the critical power level, shuts down or powers off. In response to the actual power consumption exceeding the warning power level, processing resource throttles to reduce actual power consumption and requests an increase in the critical power level.

In yet another aspect, a computer readable medium having embedded instructions for dynamically allocating power to processing resources in an information handling system includes instructions for requesting a management resource for a power allocation and for receiving a maximum power level from the management resource. The medium further includes instructions for determining a warning power level based on the maximum power level and instructions for throttling the processing resource to reduce power consumption and for requesting an increase in maximum power level in response to monitoring an actual power consumption exceeding the warning power level. The medium further includes instructions for powering off the processing resource in response to the actual power consumption exceeds the maximum power level.

A number of important technical advantages are described herein. One technical advantage is the ability to manage the allocation of power budgets to processing resources in an information handling system so that the power budget allocated to any resource is adjusted based on the actual power consumption of the resource. Using dynamic power allocation as described herein results in more efficient allocation of the available power budget so that, for example, a maximum number of processing resource may be operating simultaneously. Additional advantages will be apparent to those of skill in the art and from the FIGURES, description and claims provided herein.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Preferred embodiments of the invention and its advantages are best understood by reference to the drawings wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
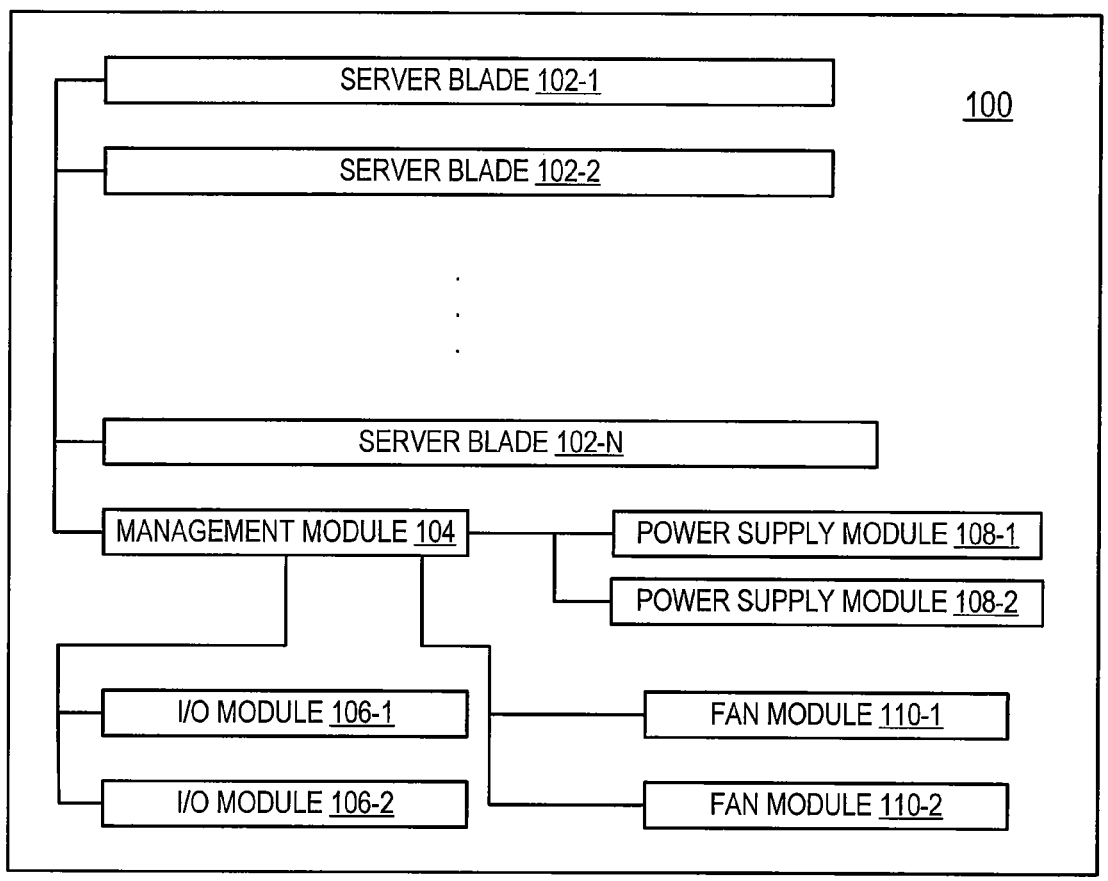
FIG. 1 is a block diagram of selected elements of a information handling system implemented as a blade server.
Figure 2:
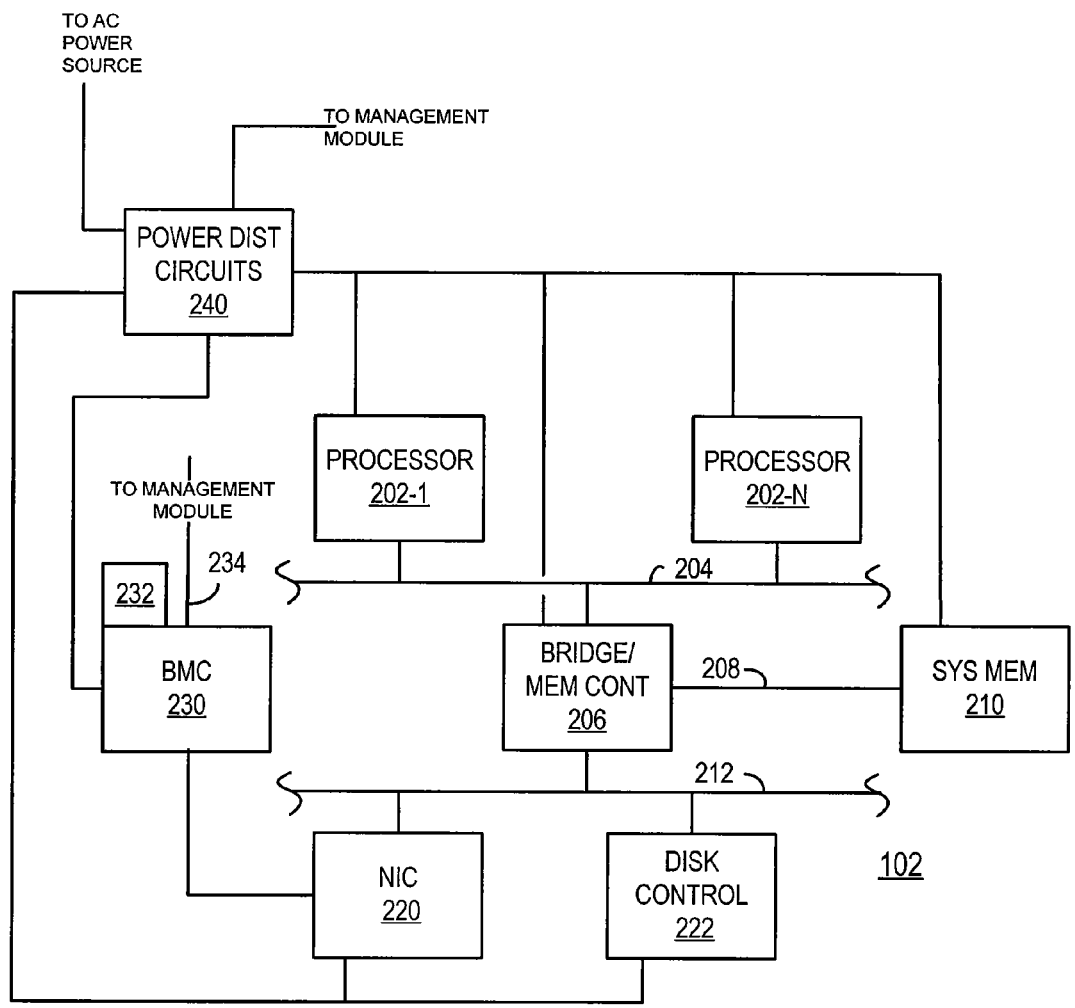
FIG. 2 is a block diagram of selected elements of a server blade suitable for use as a processing resource in the blade server depicted in FIG. 1.
Figure 3:
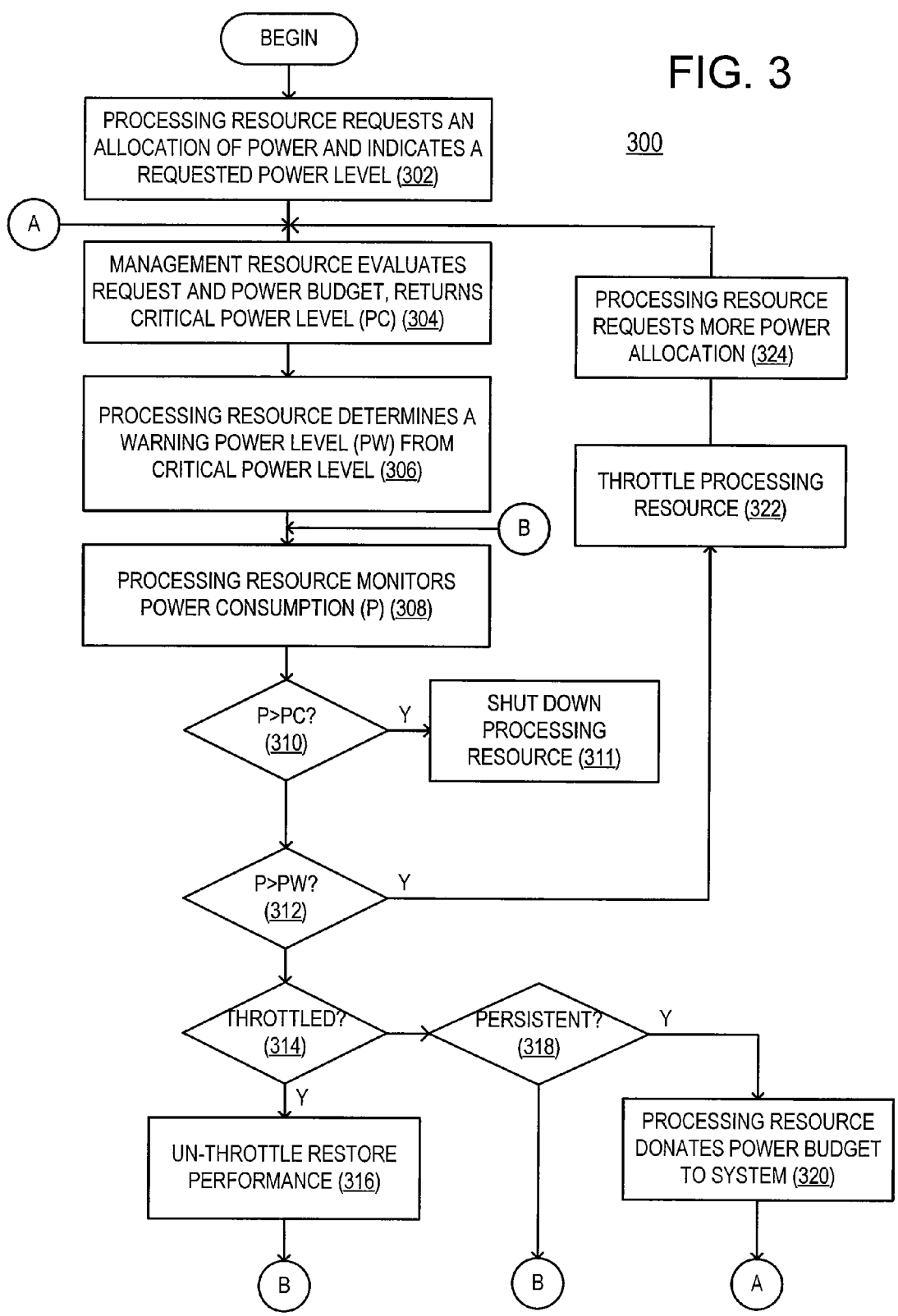
FIG. 3 is a flow diagram illustrating one implementation of a method of dynamic power allocation in an information handling system such as the blade server of FIG. 1.

Preferred embodiments and their advantages are best understood by reference to FIG. 1 through FIG. 3, wherein like numbers are used to indicate like and corresponding parts. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As indicated previously, one type of information handling system is a server system. A server system may be defined as a system that communicates with one or more client systems for the purposes of exchanging information and performing transactions. A representative server system is the blade server 100 depicted in FIG. 1. Blade server 100 as depicted in FIG. 1 includes processing resources in the form of server blades 102-1 through 102-N (generically or collectively referred to herein as server blade(s) 102). Blade server 100 also includes a management resource in the form of a management module 104, I/O resources in the form of I/O modules 106-1 and 106-2 (generically or collectively referred to as I/O module(s) 106), power supply modules 108-1 and 108-2 (generically or collectively referred to as power supply module(s) 108, and environmental resources in the form of fan module(s) 110-1 and 110-2 (generically or collectively referred to as fan module(s) 110.

Management module 104 is connected to server blades 102, I/O modules 106, power supply modules 108, and fan modules 110. In one embodiment, management module 104 connects to the other resources of blade server 100 using a relatively simple communication link such as an I2C link although other embodiments may employ other types of links such as Ethernet links, general purpose serial links, and the like. Management module 104 is operable to power on, reboot, and power off each server blade 102. In addition, management module 104 is configured to monitor environmental parameters such as chassis temperature, and to control shared resources including power supply modules 108 and fan modules 110. Management module 104, for example, is operable to detect a thermal warning and respond by turning on fans in fan module(s) 110, reducing power levels supplied by power supply modules 108 and to throttle one or more server blades 102.

In a preferred embodiment, each server blade 102 is a module resource, preferably implemented as an electronic printed circuit board containing one or more general purpose microprocessors, system memory accessible to the microprocessor(s), and other hardware/firmware needed for executing an operating system and application programs. In such embodiments, server blades 102 are preferably hot pluggable into racks or slots defined by a chassis (not depicted) of blade server 100. In a suitable embodiment, server blades 102 are plugged into racks from a first side of the blade server chassis while the manage module 104, I/O modules 106, power supply modules 108, and fan modules 110 are plugged into racks from a second side of the blade server chassis.

Referring to FIG. 2, a block diagram of selected elements of a server blade 102 suitable for use in the blade server 100 of FIG. 1 is shown. As depicted in FIG. 2, server blade 102 includes one or more processors 202-1 through 202-N connected to a system bus 204. A bus bridge and memory controller 206 is coupled to system bus 204 to a memory bus 208 that connects a system memory 210 with bridge and memory controller 206. Bridge and memory controller 206 also couples to a peripheral bus 212 to which one or more peripheral adapters may be connected. In the depicted embodiment, for example, server blade 102 includes a network interface card (NIC) 220 and a hard disk controller 222 that is coupled to persistent storage (not depicted). In addition, server blade 102 includes a service processor resource, referred to as baseboard management controller (BMC) 230.

BMC 230 preferably includes a service processor enabled to monitor the status of server blade 102 and to facilitate remote management capability for administrators. BMC 230 communicates with management module 104 to log and send alerts on the network. BMC 230 is responsible for monitoring the status of voltage and temperature probes (not depicted) on server blades 102. When BMC 230 detects an event, the event is written to a BMC hardware log and sent to management module 104 over an Intelligent Platform Management Interface (IPMI) connection 234.

In the depicted embodiment, BMC 230 is connected to NIC 220 of server blade 102 enabling administrators to access BMC 230 using an IPMI utility or Serial over LAN (SOL) commands. In addition, BMC 230 as shown is connected to power distribution circuitry 240. Power distribution circuitry 240 provides a controllable interface between a source of AC power and the functional elements of server blade 203 including the processors 202. The depicted implementation of BMC 230 also includes power monitoring circuitry 232. Power monitoring circuitry may be a current sensing circuit or another type of circuit capable of monitoring the power consumption of another resource. Although the depicted implementation indicates power monitoring circuitry 232 as residing on BMC 230, other implementations may integrated power sensing circuitry 232 into power distribution circuitry 240. In either case, BMC 230 has access to information that is indicative of the actual power consumption of server blade 203. Power sensing circuitry 232 may be operable to indicate instantaneous power consumption and/or include an integrator or other circuit suitable for determining an average value of power consumption over a specified time interval.

Some embodiments of the dynamic power allocation described herein are implemented as a set of computer executable instructions (computer software) that, when executed by a processor in an information handling system, causes the information handling system to allocate power dynamically. In such embodiments, the instructions are stored on or embedded in a computer readable medium. The medium may be a volatile medium (e.g., system memory (RAM) or cache memory (SRAM)) during periods when instructions are being executed. The medium may also be a persistent medium such as a hard disk, CD, DVD, magnetic tape, and the like, during periods when instructions are not being executed.

In one aspect, a dynamic power allocation method includes processing resources, such as the server blades 102 of information handling system 100, communicating with a management resource such as management module 104. A processing resource requests an initial power budget allocation and the management resource responds to the request, preferably by granting the request and the requested allocation. In one implementation, the power allocated by the management resource represents an absolute maximum level of power beyond which the processing resource must not operate.

The processing resource calculates or otherwise determines a power margin and sets a "warning" power level representing the difference between the allocated power level and the power margin. With the allocated power level and the warning power level determined, the processing resource then commences operation and monitors its actual power consumption. If actual power consumption exceeds the allocated power level, the processing resource shuts down immediately. If actual power consumption exceeds the warning power level, but not the allocated power level, the processing resource takes corrective action by throttling its own power consumption or otherwise operating in a reduced power consumption mode and requesting an increase in allocated power from the management resource.

In some embodiments, the processing resource remains in a reduced power consumption mode as long as its actual power consumption level exceeds its warning power level. When actual power consumption drops below the warning power level, the processing resource preferably "un-throttles" itself. Un-throttling could occur either because the processing resource's actual power consumption decreased due to, for example, a decrease in processing activity or because the management resource granted a power budget increase to the processing resource and the processing resource re-calculated a new and higher warning power level in response.

Some embodiments may support processing resource power budget donations. A power budget donation may occur if an un-throttled processing resource finds that its actual power consumption is consistently below its allocated power level. The processing resource in this case may donate a portion of its allocated power by requesting a decrease in allocated power from the management resource thereby enabling the management resource to allocate the donated power to other processing resources as needed.

Turning now to FIG. 3, a flow diagram illustrates selected elements of one embodiment of a method 300 for managing power allocation in an information handling system. Method 300 as depicted in FIG. 3 is suitable for execution by an information handling system such as the information handling system 100 depicted in FIG. 1. In the depicted embodiment, method 300 includes a processing resource requesting (block 302) a management resource for an allocation of power. The power allocation requests may be part of a power up request to the management resource from the processor resource and, more specifically, from BMC 230 or another suitable service processor resource. The power up request preferably also includes a request for an allocation of power from the management resource. The power allocation request preferably indicates a requested power level. The requested power level indicated by the processing resource is preferably based on or otherwise derived from historical power consumption data associated with the requesting processing resource. BMC 230, for example, may log historical power consumption reading and determine a requested power level by applying a predetermined algorithm to the historical data.

In the sequence depicted in FIG. 3, the management resource responds to the power allocation request by evaluating a power budget for information handling system 100 as a whole, determining a power allocation for the requesting processing resource, and indicating the power allocation to the processing resource by returning (block 304) a value, referred to herein as the critical power level or maximum power level. As suggested by its name, the critical power level is an absolute maximum level of power that the processing resource is permitted to draw.

The processing resource receives the power on grant and the critical power level from the management resource and determines (block 306) a second power level, referred to herein as the warning power level. The processing resource determines the warning power level based on the critical power level according to a predetermined algorithm. In an implementation desirable for its simplicity, for example, the processing resource may calculate a warning power level as a specified percentage of the critical power level. In other implementations, the relationship between the warning power level and the critical power level may be non-linear. The warning power level is preferably chosen to provide adequate operating margin with respect to the critical power level. The amount of margin is implementation specific and may depend on factors including, but not limited to, the historical stability of the processing resource's power consumption. If, for example, the historical power consumption of a processing resource is highly stable (e.g., power consumption values historically vary less than 2%), it may be desirable to reduce the margin between the warning power level and the critical power level. Conversely, a processing resource with a history of highly erratic power consumption values may require increased margin and an algorithm that determines the warning power level may take such factors into consideration. In addition, an algorithm for determining the power margin may incorporate other information including, as an example, but not limited to information indicative of the historical power consumption of other processing resources in the information handling system. If other server blades in an information handling system exhibit a pattern of power consumption, for example, the determination of power margin for any given processing resource may factor this information into the determination.

Following the allocation of a critical power level and the determination of a warning power level, the processing resource monitors (block 308) its actual power consumption levels. Actual power consumption monitoring is preferably achieved using power sensing circuitry 232 of BMC 230 as described above with respect to FIG. 2.

If the information handling system determines (block 310) that the actual power consumption (P) exceeds the critical power level, information handling system 100 shuts down (block 311) immediately. Shut down of power may occur through the management module 104, the BMC 230, or a combination of both.

If information handling system 100 detects (block 312) that actual power consumption exceeds the warning power level (PW), method 300 includes information handling system 100 throttling (block 322) server blade power. Throttling of server blade power may include taking power conserving action including, but not limited to, reducing the operating voltages applied to the system components and/or reducing a frequency of an system clock (not depicted) that drives the timing of server blade components.

In addition to throttling server blade power, method 300 as depicted in FIG. 3 includes the server blade requesting (block 324) the management module to allocate more power. Like the original request for power allocation made when the server blade first powers on, this request for power may include an IPMI or other suitable message between BMC 230 and management module 104. Following the request for additional power, method 300 returns to block 304 in which the management resource evaluates the request for power and returns a critical power level. If the management resource determines that additional power budget is available for allocation to the requesting server blade, the management resource will indicate a new and presumably higher critical power level. If the management module determines that there is insufficient power budget to accommodate the request for an increase, the critical power level returned by the management resource will be the same as it was previously.

Returning to decision block 312, if the actual power is not greater than the warning power level, the depicted implementation of method 300 includes determining (block 314) whether the server blade is currently operating in a throttled or other power conservation power mode. If the server blade is operating in a throttled mode, the server blade preferably restores (block 316) its operating mode to an un-throttled state such as by restoring supply voltage levels, restoring system clocks to a default frequency, and so forth. Following restoration of the server blade to an un-throttled state, method 300 returns to block 308 in which the server blade monitors is power usage.

If the server blade determines in block 314 that it is not in a throttled state, the depicted embodiment of method 300 supports power donations. More specifically, if a server blade finds that its power consumption in a fully un-throttled operating mode is consistently below its warning power levels, the server blade may request a decrease in allocated power level as a means of donating a portion of its allocated power budget back to the information handling system as a whole so that the management module can better accommodate requests for power budget increases from other system resources including other server blades. Thus, FIG. 3 as depicted includes determining (block 318) whether a server blade's actual power consumption has been consistently below its warning power levels. The definition of what constitutes "persistent" in this context is an implementation detail. An exemplary method may define persistent as a series of N consecutive power consumption data points below the warning power level. An implementation may trigger power donation activity if the actual power consumption drops below and/or remains consistently below a minimum power level. Other implementations may invoke more sophisticated techniques to determine, for example, the likelihood of a reduction in warning power level causing a drop in the performance of the blade and, if so, whether the power budget reduction is warranted.

If server blade and/or information handling system determine that a server blade is consistently below its warning power levels, the blade, according to the embodiment depicted in FIG. 3, effectively donates (block 320) a portion of its power budget back to the information handling system by requesting the management module to reduce its allocated power budget and, preferably, indicating a suggested magnitude of reduction. The suggested magnitude is preferably based on the extent to which the warning power level exceeded the actual power consumption data points. Upon requesting the power budget reduction, method 300 returns to block 304 where the management module returns a new power value. If, on the other hand, the server blade determines in block 318 that the actual power consumption data warrants a power budget donation, method 300 includes returning to block 308 in which the server blade operates normally while monitoring its power consumption.

Although the disclosed embodiments have been described in detail, it should be understood that various changes, substitutions and alterations can be made to the embodiments without departing from their spirit and scope

What is claimed is:

1. An information handling system, comprising:
 a processing resource, including a main processor and system memory accessible to the main processor;
 a management resource coupled to the processing resource and configured to power off, reboot, and power on the processing resource remotely;
 wherein the management resource is configured to respond to a power allocation request from the processing resource by evaluating a power budget of the system and allocating power to the processing resource by setting a critical power level for the processing resource;
 wherein the processing resource is configured to receive the critical power level and to determine a warning power level based at least on the received critical power level and the historical stability of power consumption by the processing; resource;
 wherein the management resource responds to a power consumption level exceed the critical power level by initiating a processing resource power off; and
 wherein the processing resource is configured to respond to an actual power consumption level exceeding the warning power level by transitioning to a power conserving mode.

2. The information handling system of claim 1, wherein the processing resource comprises a processing resource blade including a printed circuit board to which the processor and system memory are attached, wherein the blade is suitable for insertion into one of a plurality of slots in a chassis of the information handling system.

3. The information handling system of claim 2 further comprising a plurality of processing resource blades, each inserted into a respective one of the slots in the information handling system chassis.

4. The information handling system of claim 1, wherein the processing resource further responds to the power consumption level exceeding the warning power level by initiating a power budget increase request.

5. The information handling system of claim 4, wherein the management resource is configured to respond to the request for an increased power budget by determining if sufficient power is available to accommodate the request and, if so, by providing an increased critical power level.

6. The information handling system of claim 1, wherein the processing resource is further configured to respond to a power consumption level below a specified threshold by initiating a donation of a portion of the power budget to the management resource and wherein the management resource is configured to respond by determining a reduced power budget for the processing resource and setting a reduced processing resource critical power level.

7. The information handling system of claim 1, wherein the power conserving mode is selected from a group of power conserving actions consisting of throttling performance of the processor resource and requesting a larger allocation of power from the management resource.

8. A method of allocating power in an information handling system, comprising:
 responsive to a request from a processing resource, determining a critical power level and allocating the critical power level to the processing resource;
 responsive to receiving the critical power level, determining a warning power level based at least on the received critical power level and the historical stability of power consumption by the processing resource, the warning power level being lower than the critical power level;
 monitoring actual power consumption of the processing resource;
 responsive to the actual power consumption exceeding the critical power level, shutting down the processing resource;
 responsive to the actual power consumption exceeding the warning power level, throttling the processing resource to reduce actual power consumption and requesting an increase in the critical power level.

9. The method of claim 8, wherein determining the critical power level includes determining the critical power level based on historical power consumption data associated with the processing resource.

10. The method of claim 8, wherein monitoring actual power consumption includes monitoring actual power consumption with current sensing circuitry accessible to a service processor resource of the processing resource.

11. The method of claim 8, wherein throttling the processing resource includes an action selected from the group consisting of reducing power supply levels to the processing resource and reducing a frequency of a clock signal that controls timing of the processing resource.

12. The method of claim 8, further comprising, responsive to the actual power consumption not exceeding the warning power level, determining if the processing resource is in a throttled state and, if so, restoring the processing resource to an un-throttled state.

13. The method of claim 12, further comprising, responsive to determining that the processing resource is not in a throttled state, determining if the processing resource power consumption is persistently below the warning power level and, if so, requesting a reduction in critical power level from the management module.

14. The method of claim 13, wherein determining if the processing resource is persistently below the warning power level includes detecting that the actual power consumption is below a minimum power level, which is less than the warning power level.

15. A computer readable medium containing computer executable instructions embedded in the medium, for dynamically allocating power to processing resources in an information handling system, the instructions comprising:
 instructions for requesting a management resource for a power allocation and for receiving a maximum power level from the management resource;
 instructions for determining a warning power level based on the maximum power level and the historical stability of power consumption by the processing resource;
 instructions for powering off the processing resource responsive to actual power responsive to monitoring the actual rower consumption exceed the maximum power level; and
 instructions for throttling the processing resource to reduce power consumption and for requesting an increase in maximum power level responsive to monitoring an actual power consumption exceeding the warning power level.

16. The computer readable medium of claim 15, further comprising instructions for un-throttling a processing resource that is in a throttled state responsive to monitoring actual power consumption less than the warning power level.

17. The computer readable medium of claim 15, further comprising instructions for determining whether to request the management resource for a reduction in maximum power level responsive to monitoring an un-throttled power consumption below the warning power level.

18. The computer readable medium of claim 17, wherein the instructions for determining further comprise instructions for requesting the reduction responsive monitoring an un-throttled power consumption below a minimum power threshold.

19. The computer readable medium of claim 17, wherein the instruction for determining further comprise instructions for requesting the reduction responsive to monitoring an un-throttled actual power consumption persistently below the warning power level.

20. The computer readable medium of claim 15, further comprising, instructions for detecting the management resource granting the request for the increase in maximum power consumption and, responsive thereto, instructions for revising the warning power level.

21. An information handling system, comprising:

a processing resource, including a main processor and system memory accessible to the main processor;

a management resource coupled to the processing resource and configured to power off, reboot, and power on the processing resource remotely using a plurality of power supply modules;

wherein the management resource is configured to respond to a power allocation request from the processing resource by evaluating a power budget of the system and allocating power to the processing resource by setting a critical power level for the processing resource;

wherein the processing resource is configured to receive the critical power level and to determine a warning power level based at least on the received critical power level and the historical stability of power consumption by the processing resource;

wherein the management resource responds to a rower consumption level exceed the critical rower level by initiating a processing resource rower off;

wherein the processing resource is configured to respond to an actual power consumption level exceeding the warning power level by transitioning to a power conserving mode;

wherein the processing resource is further configured to respond to a power consumption level below a specified threshold by initiating a donation of a portion of the power budget to the management resource and wherein the management resource is configured to respond by determining a reduced power budget for the processing resource and setting a reduced processing resource critical power level; and wherein the management resource responds to the donation of a portion of the power budget by taking one of the plurality of power supply modules off-line.

* * * * *